Aug. 21, 1928.　　　　　　　　　　　　　　　1,681,448
S. L. TUCKER ET AL
AUTOMOBILE HEADLIGHT AND CONTROL MECHANISM
Filed April 2, 1927　　　2 Sheets-Sheet 1

Seth L. Tucker
Floyd C. Tucker
INVENTOR.

BY Richard B. Owen
ATTORNEYS.

Witnesses
C. E. Churchman
Wm R. Smith

Aug. 21, 1928.  1,681,448
S. L. TUCKER ET AL
AUTOMOBILE HEADLIGHT AND CONTROL MECHANISM
Filed April 2, 1927   2 Sheets Sheet 2
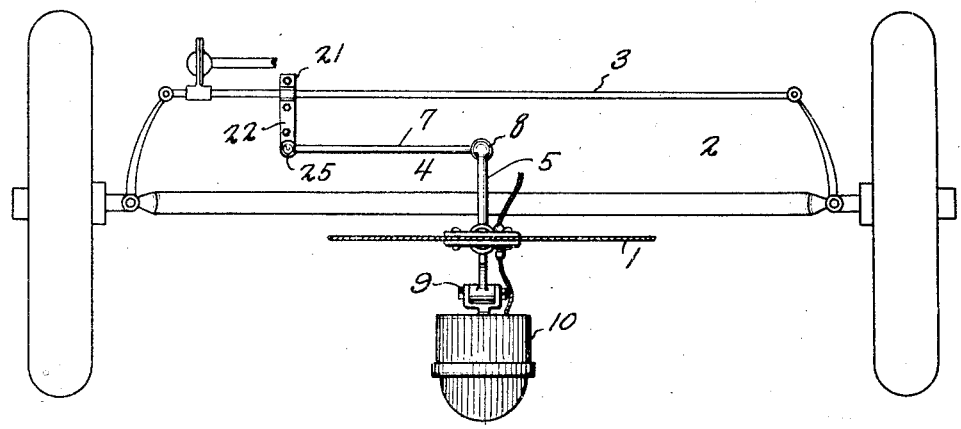
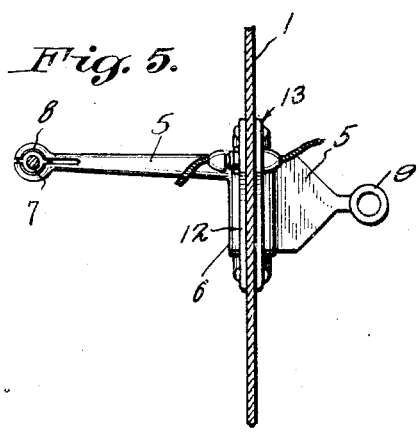
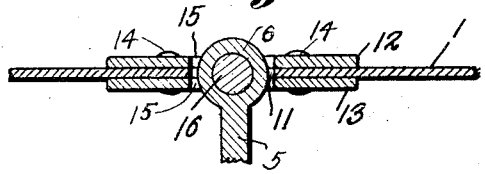
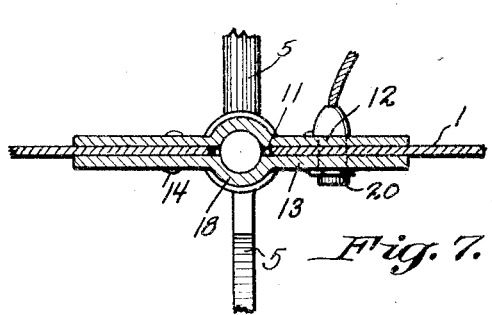
Seth L. Tucker
Floyd C. Tucker
INVENTOR.

Patented Aug. 21, 1928.

1,681,448

UNITED STATES PATENT OFFICE.

SETH L. TUCKER AND FLOYD C. TUCKER, OF HORNELL, NEW YORK.

AUTOMOBILE HEADLIGHT AND CONTROL MECHANISM.

Application filed April 2, 1927. Serial No. 180,545.

This invention relates to an automobile headlight and operating mechanism therefor, and has for its primary object the provision of a construction by means of which the headlight will be automatically adjusted according to the direction of travel of the automobile.

An object of the invention is the design of a construction that may be properly and effectively secured to and supported solely by the forward apron of an automobile.

Another object of the invention is the novel construction of support between the mechanism and the apron so that the same may be quickly and effectively secured in place, while at the same time capable of all the angular adjustments necessary in the travel of the automobile.

Besides the above, our invention is distinguished in the incorporation of a novel construction of arm in the light operating mechanism so that the same may pass through and be effectively secured to the apron of the automobile, while at the same time accommodating the relative displacement of the steering mechanism and the apron in the travel of the automobile.

With these and other objects in view, our invention will be better understood from a description of the same when taken in connection with the accompanying drawings, wherein:—

Figure 2 is a top plan view;

Figure 5 is a vertical sectional view through the apron showing the arm in position.

Figure 6 is a horizontal sectional view through the bearing and associated parts;

Figure 7 is a view similar to Figure 6;

Figure 8 is a side elevation of the clamp;

Figure 1:
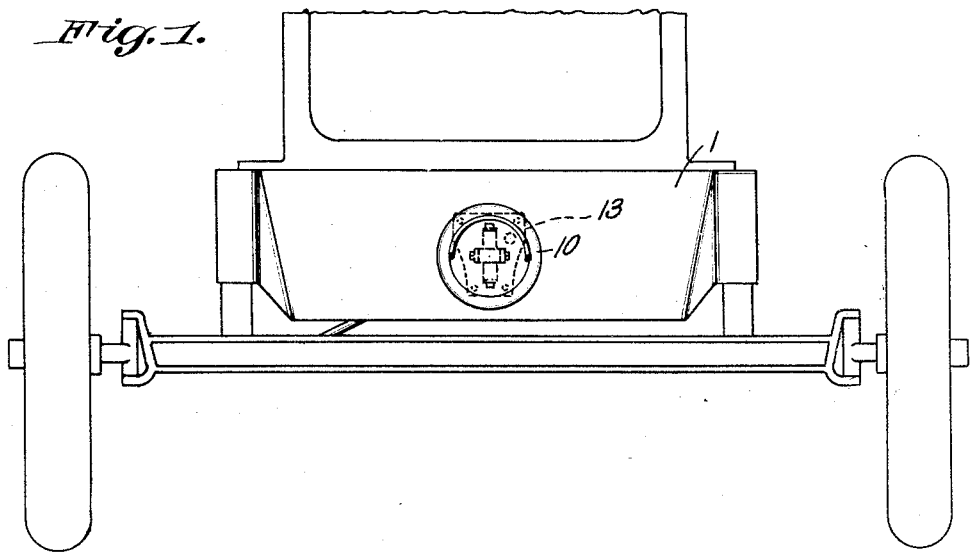
Figure 1 is a front elevation of an automobile showing our invention applied thereto.
Figure 3:
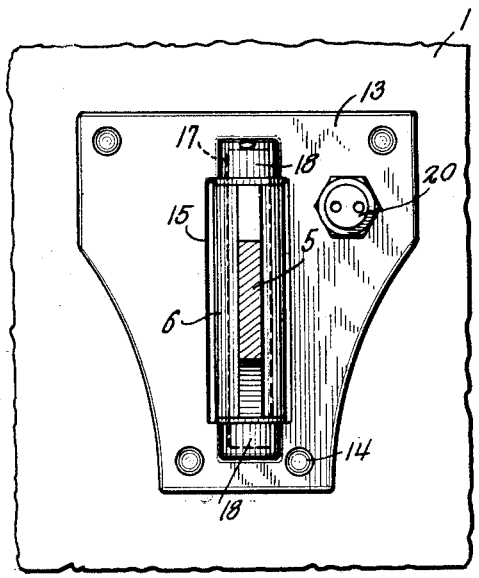
Figure 3 is a front elevation of the apron showing the arm in section and associated therewith.
Figure 4:
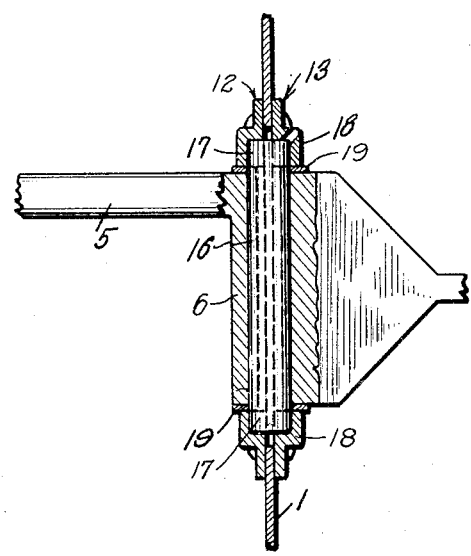
Figure 4 is a vertical sectional view through the bearing and associated parts.

Again referring to the drawings illustrating one embodiment of our invention, the numeral 1 designates the usual apron at the forward end of an automobile arranged directly in front of the usual steering mechanism 2 including the well known connecting rod 3.

Our improved headlight and operating mechanism, designated in its entirety by the numeral 4, is associated with this apron 1 and connecting rod 3 so as to be substantially and effectively supported in place and automatically operated in the movements of the connecting rod 3. This operating mechanism consists of a supporting arm 5 provided at an intermediate point with the bearing 6 and having one end connected to a link 7 by the ball and socket joint 8. The forward end 9 of the arm may be of any required construction to be effectively secured to the various designs of headlights 10 now in use or, in fact, may be of a special construction as illustrated in our co-pending application, filed April 2, 1927, Serial #180,344 whereby the headlight is detachably secured to the arm for reasons clearly set forth in that application.

To accommodate the passage of the arm through the apron, the latter is provided with an opening 11 surrounded by the clamp plates 12 and 13 which are riveted to the guard plate 1, as indicated at 14. These plates are also provided with openings 15 aligning with opening 11 so as to accommodate the bearing 6 properly to allow swinging movements of the arm. This bearing 6, which is of the sleeve type, has mounted therein a shaft 16 of a length to provide the protruding ends 17. The protruding ends 17 are effectively embraced and secured in place by the companion socket sections 18 carried by the plates 12 and 13, and to complete the bearing construction we provide the washers 19 for compensating for wear and to provide a better bearing surface for the parts. Under certain conditions it is advisable to incorporate in the plate construction an electric plug 20 whereby the proper electrical connections may be made with the headlight 10.

To complete the invention, we provide the clamp 21 consisting of the upper strap 22 and lower strap 23 detachably and adjustably secured to the rod 3 by the clamp bolts 24. This clamp has a ball and socket connection 25 with the link 7 so that in the reciprocatory movements of the rod 3, movement will be simultaneously transmitted to the arm 5 for swinging the same according to the travel of the rod to position the headlight 10 to direct its rays in the proper direction. The ball and socket connection, besides allowing for this angular movement of the arm, accommodates relative movements between the rod and apron 1 in the usual travel of the automobile.

From the forgoing description taken in con nection with the accompanying drawings, it will be apparent that we provide a simple and substantial construction of operating mechanism that may be quickly and effectively secured to the usual apron of an automobile and operatively associated with the steering mechanism of the automobile so that the headlight will be simultaneously and properly adjusted in the movement of the steering mechanism to project light rays in the proper direction. It will also be appreciated that the connection and arrangement of the parts is such that the light is arranged at a relatively low level so that the light rays projected therefrom will not interfere with the vision of a driver of a machine approaching from the opposite direction.

It is, of course, to be understood that the various parts may be designed, constructed and associated in various other relations than illustrated and the mechanism may be automatically or manually operated without in any manner departing from the spirit of the invention and, therefore, we do not desire to be limited in any respect except as set forth in the following claims.

We claim:—

1. In combination with the apron of an automobile having an opening therein, headlight control mechanism encluding an arm having an intermediately arranged bearing, a shaft upon which the bearing of the arm is mounted, and plates arranged on opposite sides of the apron contiguous to said opening and provided with mating bearing portions for the ends of said shaft.

2. An automobile headlight control mechanism comprising a pair of plates embodying means adapting them to be attached to a part of an automobile, the said plates having mating bearing portions and opposed openings therein extending between said bearing portions, a shaft mounted at its ends in said bearing portions and extending vertically within said opening, a sleeve mounted for rotative adjustment upon said shaft and within said opening, an arm extending from one side of said sleeve, means upon the arm for the support of a head-light, an arm extending from the opposite side of the sleeve, and means connected with the last mentioned arm and embodying means for connection with an element of the steering mechanism of the automobile.

In testimony whereof we affix our signatures.

SETH L. TUCKER.
FLOYD C. TUCKER.